(12) United States Patent
Waldman et al.

(10) Patent No.: US 7,527,914 B2
(45) Date of Patent: May 5, 2009

(54) READING INHIBIT AGENTS

(75) Inventors: David A. Waldman, Concord, MA (US); Eric S. Kolb, Acton, MA (US); Chunming Wang, Tewksbury, MA (US)

(73) Assignee: STX Aprilis, Inc., Maynard, MA (US)

( * ) Notice: Subject to any disclaimer, the term of this patent is extended or adjusted under 35 U.S.C. 154(b) by 555 days.

(21) Appl. No.: 11/039,163

(22) Filed: Jan. 19, 2005

(65) Prior Publication Data

US 2005/0213488 A1    Sep. 29, 2005

Related U.S. Application Data

(63) Continuation of application No. 10/290,068, filed on Nov. 6, 2002, now abandoned.

(60) Provisional application No. 60/332,889, filed on Nov. 6, 2001.

(51) Int. Cl.
*G11B 7/24* (2006.01)

(52) U.S. Cl. .................. 430/270.11; 430/945; 430/321; 428/64.4; 428/64.1; 369/288; 369/283

(58) Field of Classification Search .................. None
See application file for complete search history.

(56) References Cited

U.S. PATENT DOCUMENTS

| | | |
|---|---|---|
| 4,252,671 A | 2/1981 | Smith |
| 4,252,672 A | 2/1981 | Smith |
| 4,252,674 A | 2/1981 | Smith |
| 4,252,675 A | 2/1981 | Smith |
| 4,252,677 A | 2/1981 | Smith |
| 4,328,303 A | 5/1982 | Ronn et al. |
| 4,343,879 A | 8/1982 | Drexler et al. |
| 4,496,957 A | 1/1985 | Smith et al. |
| 5,080,947 A | 1/1992 | Yamada et al. |
| 5,815,484 A | 9/1998 | Smith et al. |
| 6,011,772 A | 1/2000 | Rollhaus et al. |
| 6,511,728 B1 | 1/2003 | Bakos et al. |
| 6,537,635 B1 | 3/2003 | Bakos et al. |
| 2001/0022769 A1 | 9/2001 | Waki et al. |
| 2002/0006580 A1 | 1/2002 | Ishimaru et al. |

FOREIGN PATENT DOCUMENTS

| | | |
|---|---|---|
| EP | 0 023 102 | 1/1981 |
| JP | 57 012425 | 1/1982 |
| JP | 57024290 | 2/1982 |
| JP | 57039989 | 3/1982 |
| JP | 58050533 | 3/1983 |
| JP | 59135639 | 8/1984 |
| JP | 62270386 | 11/1987 |
| WO | WO 01/29828 A1 | 4/2001 |
| WO | WO 2005/006529 A1 | 1/2005 |

OTHER PUBLICATIONS

Baucherel, Xavier, et al., "Unexpected Catalyzed C=C Bond Cleavage by Molecular Oxygen Promoted by a Thiyl Radical," *J. Org. Chem.*, 66: 4504-4510 (2001).

*Primary Examiner*—Martin J Angebranndt
(74) *Attorney, Agent, or Firm*—Hamilton, Brook, Smith & Reynolds, P.C.

(57) ABSTRACT

Disclosed is an optical disk, card or media which comprises: a) a plurality of data structures that are readable by the interrogating beam of light; and b) a composition on or in the optical disk, card or media disposed so that when the optical disk, card or media is used in the optical read-out system, the interrogating beam of light passes through the composition before or after contacting some or all of the data structures. The composition comprises a polymeric matrix with an organometallic complex dissolved therein or with metal, transition metal, metal oxide or transition metal oxide nanoparticles uniformly dispersed therein. The composition is substantially transparent to the interrogating beam and/or is substantially colorless. Alternatively, the composition comprises a solid polymeric matrix with an olefinic compound dissolved or uniformly dispersed therein wherein double bond in the olefinic compound undergoes oxidative cleavage promoted by a transition metal catalyst and a thiophenol or a catalytic amount of a thiyl radical and wherein the composition is substantially transparent to the interrogating beam and/or is substantially colorless.

16 Claims, No Drawings

READING INHIBIT AGENTS

RELATED APPLICATIONS

This application is a continuation of U.S. application Ser. No. 10/290,068, filed Nov. 6, 2002 now abandoned, which claims the benefit of U.S. Provisional application Ser. No. 60/332,889, filed Nov. 6, 2001, the entire teachings of which are incorporated herein by reference.

BACKGROUND OF THE INVENTION

This invention relates to a method of using materials that are applied to a disk or card or the like, such as would be used for storing information, such that upon subsequent exposure to an ambient condition said applied material changes from a substantially transparent state to one that is substantially more opaque as a consequence of the creation of light scattering centers, color change, and/or reflectivity change, thereby limiting the ability to read information from said disk, card, or the like after the desired information has been read from the disk for a certain duration of time.

U.S. Pat. No. 5,815,484 describes a limited play optical disk using photochromism, defined as a phenomenon whereby irradiation of a material by light exhibiting desirable wavelengths effects reversible or irreversible changes to the optical absorbance of the material. In particular, irradiation of a coating comprising a photochromic material by light alters the reactive material in the coating so as to change the coating from an optically transparent to an optically opaque state. More specifically, the aforementioned prior art describes the combination of light and oxygen as the stimulus that changes the absorbance characteristics of a photochromic material in response to an interrogating beam of light having a wavelength desirably of about 650 nm. It further describes that when the stimulus is exclusively air, such as from the ambient environment, then the reactive material, which for example comprises a compound selected from a group of dye molecules, changes its state as a result of oxidation from an optically transparent to an optically opaque state that absorbs light of desirable wavelengths used for reading the information from the disk. The active material is described as preferably superimposed over some or all of the plurality of data structures in the optical disk, in the form of a coating on a least a portion of the outer surface of the substrate. U.S. Pat. No. 5,815,484 further specifies that if the material were to be interposed between the substrate and the metallic layer then it would be inherently more difficult to manufacture the optical disk.

Compounds I and II, of U.S. Pat. No. 5,815,484, specifically react upon exposure to 650 nm light at an intensity consistent with the light sources for current DVD players. Moreover, these compounds are photoreactive in the presence of oxygen from ambient air upon exposure to either incandescent or fluorescent light. Accordingly, it is required that compounds I and II, as part of a coating applied to a disk, be stored in inert environment, free of oxygen, prior to exposure to the light from sources such as semi-conductor lasers used for the DVD players. U.S. Pat. No. 5,815,484 also specifies that oxygen reactive materials, for example, the dye compound methylene blue, can be used as the reactive compound that in its reduced form exhibits a pale yellow color, and which re-oxidizes to a dark blue color upon exposure to oxygen in ambient air. This dye and other described dye materials only require exposure to oxygen, and not to the combination of oxygen and light, for the desired change in absorbance characteristics. Accordingly, it is also necessary to store the optical disk containing a coating comprising such dyes in an inert environment free of oxygen prior to use in a CD or DVD player. This requires special packaging to prevent or substantially limit diffusion of oxygen, and perhaps also the use of oxygen adsorbing compounds as part of the packaging. Moreover, once the special packaging is removed and the disk is exposed to ambient conditions, then the coating applied to the disk and which contains the reactive materials must also have been protected against solvents that could subsequently be used to remove or alter said reactive materials, and also protected from use of mechanical methods, such as, for example, polishing or grinding that could be used to remove said coating. The use of such reactive compounds does not contemplate the future use of semi-conductor lasers with shorter wavelengths for more advanced optical disk technologies. Specifically, the dye compounds described would not be appropriate for DVD players incorporating the use of lasers emitting at say 405 nm.

U.S. Pat. No. 5,815,484 claims a method of limiting access to data stored on an optical medium wherein said disk comprises an area containing a plurality of readable data structures and which is coincident with a reactive compound superimposed over at least a portion of said data structures of said area. The reactive compound is to be operated in an ambient environment containing oxygen and the absorbance of light by the material, in response to a combination of exposure to oxygen and to irradiation for some duration of time by light having a wavelength within a selected range, is altered causing a change in optical transmission from said area. A requirement of exposure to both ambient environment and irradiation for some duration of time is particularly disadvantageous. The intensity of semiconductors lasers used in CD and DVD players is not uniform from different manufacturers and thus the duration of time for said irradiation will vary for different players. Moreover, the selected range of wavelengths for said irradiation would be difficult to implement, using the methods contemplated, for a range as broad as between about 780 nm and 405 nm, as would be necessary to prevent defeatability of limited play at shorter wavelengths and provide for useful backwards compatibility.

U.S. Pat. No. 5,815,484 further claims an optical disk adapted for use in an optical readout system such that the disk comprises a film of a reactive compound which is operative to change in response to a stimulus applied to the reactive compound. The film is disposed as an overlayer on a substrate that is in a confronting relationship with a reflecting metallic layer or interposed between said metallic layer and the substrate. Said stimulus is either visible light, infrared light, an ambient environment containing light and oxygen, or air. When the claimed optical disk is adapted specifically for the stimulus being only air, then the reactive compound is operative after a duration of time needed to oxidize and change the absorbance characteristics of the material between a transparent and suitably opaque state that absorbs light of the desired wavelength. An optical disk containing a film comprising said reactive compound that is a chemically reduced form of a dye is further claimed. It is also further claimed that an improved optical disk contains a reactive compound responsive to irradiation by the interrogating beam such that the chemical characteristic of the compound is intentionally changed between transparent and suitably opaque states by exposure to the light, such that the altered reactive compound absorbs light of desired wavelengths. The intensity of semiconductors lasers used in CD and DVD players is not uniform from different manufacturers and thus the required reduction in absorbance of the desired wavelengths will vary for different players. Additionally, the signal to noise requirements for detection of reflected light for reading from DVD and CD media by photo-detectors in said players is not uniform for players from different manufacturers. Moreover, absorbance of the selected range of wavelengths would be difficult to implement, using the methods contemplated, for a range as broad as between about 780 nm and 405 nm, as would be necessary to prevent defeatability of limited play at other wavelengths and provide for useful backwards compatibility U.S. Pat. No. 5,815,484 additionally claims a method for limiting access to data stored on an optical disk having a substrate, a metallic layer encoded with information, and a reactive layer through which the radiation passes prior to being reflected for reading, wherein the reactive layer is exposed to an unspecified environmental stimulus that changes the optical characteristic of said reactive layer from an optically transparent state to an optically opaque state. The claimed method suffers from a serious disadvantage that in practice can substantially compromise and defeat the intended objective. Although the patent specifies the importance of a method for forming an opaque state in the reactive layer that absorbs light of the desired wavelengths, opacity is not defined as being able to withstand defeatability of the desired absorbance state that may otherwise occur due to subsequent exposure of the disk to light containing UV and/or visible wavelengths. Exposure of a disk comprising the reactive material to light, such as readily available and obtained from sunlight, mercury arc lamps, Xenon flash lamps, etc. will generally photobleach the opacity of a reactive layer comprising reactive compounds that are photoactive materials such as defined in U.S. Pat. No. 5,815,484. Photobleaching herein is defined as causing a substantial decrease of said opacity exhibited by the reactive layer. Complete photobleaching of the photoactive material in the reactive layer causes said layer to exhibit a change from said opacity to a state of relative transparency. Specifically, U.S. Pat. No. 5,815,484 contemplates and claims the use of quasi-stable photochromic compounds, such as spiropyrans, and the use of organic dye molecules such as methylene blue and related compounds. U.S. Pat. No. 5,815,484 did not contemplate that the preferably formed state of opacity in the reactive layer comprising said photoactive compounds can be photobleached, especially when said compounds are present in an environment that can alter the oxidized state, and consequently the desired absorbance state at certain wavelengths can be modified to cause the reactive layer to exhibit a relatively undesired transparent state. Similarly, undesirable photobleaching can effect a diminution in the level of absorbance exhibited at the desired wavelengths, as well as a shift in the absorbance spectrum such that absorbance at the desired wavelengths diminishes and is no longer adequate to prevent reading of information from the optical disk at the desired wavelengths emitted by the lasers used for the players.

Organic dyes contemplated by U.S. Pat. No. 5,815,484 are converted from a chemically reduced form or leuko state (non absorbing at the interrogating wavelength) to the desired colored state by oxidation via exposure to oxygen in ambient air to form a suitably opaque state that absorbs light at the desired wavelengths. While this process may be reversible, organic dyes generally can be "photobleached" using UV irradiation, such as readily available from sunlight, mercury arc lamps, Xenon flash lamps, etc., and in certain cases loss of opacity can be effected by simply exposing the reactive layer to elevated temperatures. The photo-stability (stability to bleaching processes) and heat stability of the dye is a fundamental problem with organic dyes not contemplated by U.S. Pat. No. 5,815,484. Consequently, the specified and claimed technology would require stabilizers and/or additional protective layers to obviate the obvious defeatability problems.

Another disadvantage with this technology is that it does not anticipate the roadmap for the migration from long to significantly shorter wavelengths for semi-conductor lasers used, for example, by DVD players for reading of information from the optical disk. The currently used lasers irradiate with wavelengths at about 650 nm, while the roadmap devices currently being tested for product introduction as soon as 2002 will have interrogating wavelengths of only about 405 nm. Additionally, the technology does not contemplate the possibility of an optical disc comprising the specified light absorbing reactive layer as being read by more that one type of player. For example, today DVD players commonly used on personal computers, can read both CD and DVD type optical disk media. This requires the use of more than one wavelength for the interrogating laser employed to read information from the two types of optical disks, and additionally the intensity of the lasers and the signal to noise requirements of the photodetectors are not the same. Accordingly, an optical disk that may be unplayable with one type of device may have acceptable play-back characteristics for a second type of device, and thus the desired goal of limited play would not necessarily be achieved. Moreover, the intensities of lasers differ for CD and DVD players made by different manufacturers, as do the signal to noise requirements of the optical pickups or detectors in these players. Consequently, the degree of retained opacity necessary to prevent reading of information on a disk is not the same for one type of manufactured player versus another, and likely also varies as a function of time of use of a particular player.

Other prior art, see for example U.S. Pat. No. 6,011,772 of SpectraDisc Corp., describes a number of methods to limit optical disc readability. Corrosion of the reflective Al layer (or other metal used to reflect light of the laser from information-encoding features so as to read the information on the disk) by the incorporation or delivery of humidity (water) to form an "electrolyte" at or near the surface of the reflective layer and thus catalyze corrosion is such a method. It is preferred that selective corrosion of the Al layer occur so as to cause sufficient loss in reflectivity of the Al layer to prevent optical reading of the encoded information on the disk. This invention, however does not anticipate the current industrial practice incorporating a protective barrier layer, typically SiOx which aggressively prevents the corrosion of the metallic layer. The SiOx layer is necessary to prevent premature corrosion of the metal layer during manufacturing, especially in the case of Al reflective layers where the outermost 100 angstroms of sputtered or vapor deposited layers is known to be completely oxidized in microseconds even in substantially purified environments, a problem that plagued the industry in the past. U.S. Pat. No. 6,011,772 specifies that the reflective layer of FIG. 16 is indeed protected by a barrier layer to prevent such oxidation and physical damage, whereas U.S. Pat. No. 5,815,484 specifies in FIGS. 3, 5, 6, and 7 the use of a barrier layer located adjacent to the reflective layer.

U.S. Pat. No. 6,011,772 further specifies the use of a barrier layer that would be releasably coupled to the disk and that would prevent both machine-reading of the disk and activation of a reading-inhibit agent (RIA). Consequently, the user of the optical disk would be required to remove said barrier layer so as to allow for reading of the information on the disk. Removal of this barrier layer is specified to activate a reading-inhibit agent that will subsequently alter the disk to inhibit reading of the disk after a certain time of exposure of the disk to ambient environment that contains oxygen and moisture and/or irradiation from the reading laser beam of the optical drive. The requirement for diffusion of oxygen and water vapor from the ambient environment through a permeable layer, at a controlled rate, to the metal layer is disadvantageous. The ambient environment is defined by where a particular player is used and thus does not take into consideration the considerable variability in humidity that generally exists in different seasons and in different parts of a country or the world in any season or even in the day versus the night. Accordingly, the limited play time of such a disk could be highly variable depending, for example, if the disk was even made for use in the same state, such as for the case of Dallas versus Houston, Texas where the relative humidity can differ by at least 55%.

Additionally, U.S. Pat. No. 6,011,772 specifies that the read inhibiting agents (hereinafter "RIA") can be activated by machine-reading the disk such as by the optical radiation that is incident on the disk during machine-reading or by rotation of the disk during machine-reading. This approach suffers from some of the same deficiencies as described above for U.S. Pat. No. 5,815,484. In another embodiment of the barrier layer U.S. Pat. No. 6,011,772 specifies that said layer is formed instead as a closed package that seals the entire optical disk from contact with the ambient oxygen and moisture. This does not reduce the aforementioned disadvantage of requiring activation by both ambient oxygen and moisture.

In another embodiment U.S. Pat. No. 6,011,772 proposes to inhibit reading of information on the disk by incorporation of agents that scatter the reading beam. The scattering mechanism disclosed employs an organic solvent and a polymer layer. The polymer layer, when exposed to an organic solvent, depending on concentration and exposure time, will experience a loss in transparency. In this case the read-inhibiting agent is stated to be the organic solvent working in concert with a polymer film. While this method may work to prevent readability, and is readily effected using common solvents and polymer materials such as polycarbonate, the practicality of dispensing a volatile organic solvent in an electronic device is limited. Solvent flammability, toxicity, and volatility, solvent caused corrosive effects on microelectronic circuitry found in the player, and solvent caused deleterious structural changes to surfaces of the optical components and/or their mounts in the CD and/or DVD player would severely impact general usability and lifetime of the player. These and other effects resulting from use of organic solvents for purposes of scattering the reading laser beam would substantially complicate the use and adoption of this embodiment of the specified technology for the intended purpose of limiting the duration for reading information from the said disk.

In another embodiment the inventor specifies the use of optical radiation from a second optical source (i.e. high pressure arc lamp, fluorescent lamp, incandescent lamp, laser) to activate the read-inhibiting agent. The radiation source is coupled to the interrogation beam such that the RIA is activated after the reading beam has firstly read the data. While this method may provide a method to activate the RIA, the coupling of such a secondary light source is not currently employed in standard optical disc play devices. The incorporation of such an activation mechanism would limit the disc from a practicality standpoint unless the majority of DVD and/or CD players incorporated the secondary light source. Moreover, activation of the RIA and the subsequent increase in absorbance of the wavelength used for the reading beam would require different amounts of absorbance for different levels of irradiance provided by reading beams in players from different manufacturers. U.S. Pat. No. 6,011,772 also describes a second source that would be sufficiently strong so as to obviate need for a RIA, but in this case, for example, the light source could cause ablation creating scattering centers that would limit access to information on the disk immediately after the information is read. A simpler approach is further described as an alternative wherein the read/interrogation beam could itself be used to activate the RIA. In this embodiment the RIA is contemplated to absorb some of the intensity of the interrogation read beam and then the activated RIA would attenuate the interrogating beam further and may inhibit proper reading of the data during the read lifetime of the disc.

SUMMARY OF THE INVENTION

This invention relates to a method of using materials that are applied to a disk, card, media or the like, such as would be used for storing information, such that upon subsequent exposure to an ambient condition said applied material changes from a substantially transparent state to one that is substantially more opaque as a consequence of the creation of light scattering centers, color change, and/or reflectivity change, thereby limiting the ability to read information from said disk, card, media or the like after the desired information has been read from the disk for a certain duration of time without the typical disadvantages of other methods such as susceptibility to photobleaching and/or lack of opacity to other wavelengths of light contemplated to be used to read the information.

The materials may be applied as a coating disposed as a protected or non protected overlayer on a substrate that is in a confronting relationship with a reflecting metallic layer, said metallic layer being encoded with the information data structures to be read or at least disposed as a layer on the structural features comprising such information data structures, or the material may be interposed between said metallic layer and the substrate, or superimposed over at least a portion of a plurality of readable data structures in the disk, card, media or the like, such as would be used for storing information, or the material may be applied in any other configuration including but not limited to incorporation of the material into an adhesive bonding layer such as used between the two sides of Digital Video Disks (DVD) or would be contemplated for other optical disk or card technology comprising two or more layers, or in other ways that would affect the ability to interrogate the information data structures stored in an optical disk, card, media or the like such that when the material is activated it prevents reading of the disk, card, media or the like after an initial time period during which the desired information data structures can be read from the disk, card, media or the like.

One embodiment of the present invention is an optical disk, card or media for use in an optical read-out system that comprises a light source operative to produce an interrogating beam of light for reading data structures. The optical disk, card or media comprises:

a. a plurality of data structures that are readable by the interrogating beam of light; and b. a composition on or in the optical disk, card or media disposed so that when the optical disk, card or media is used in the optical read-out system, the interrogating beam of light passes through the composition before or after contacting some or all of the data structures. The composition comprises a polymeric matrix with an organometallic complex dissolved therein or with metal, transition metal, metal oxide or transition metal oxide nanoparticles uniformly dispersed therein. The composition is substantially transparent to the interrogating beam and/or is substantially colorless. Alternatively, the composition comprises: i) a solid polymeric matrix with an olefinic compound dissolved or uniformly dispersed therein; and ii) a transition metal catalyst and a thiophenol or a catalytic amount of a thiyl radical. The composition is substantially transparent to the interrogating beam and/or is substantially colorless.

Another embodiment of the present invention is a method of limiting access to data stored on the optical disk, card or media described above. The method comprises the step of exposing the optical disk, card or media to an ambient condition.

Another embodiment of the present invention is a method for coating an internal or external surface of a device with a layer that is substantially transparent to visible light. The layer is further characterized in that it undergoes a reduction in said transparency when exposed to an ambient condition. The method comprises the steps of:
a. dispensing onto the surface a film of a solution comprising at least one monomer or at least one oligomer. The solution additionally comprises an organometallic complex, metal, transition metal, metal oxide or transition metal oxide nanoparticles dissolved therein or uniformly dispersed therein. Alternatively, the solution comprises: i) at least one monomer or oligomer with an olefinic compound dissolved or uniformly dispersed therein; and ii) a transition metal catalyst and a thiophenol or a catalytic amount of a thiyl radical; and
b. polymerizing the monomer(s) or oligomer(s) to form a polymer.

Another embodiment of the present invention is a method for coating an internal or external surface of a device with a layer that is substantially transparent to visible light. The layer undergoes a reduction in said transparency when exposed to an ambient condition. The method comprises the steps of:
a. dispensing onto the surface a film of a solution comprising at least one polymer. The solution additionally comprises an organometallic complex, metal, transition metal, metal oxide or transition metal oxide nanoparticles dissolved therein or uniformly dispersed therein. Alternatively, the solution comprises: i) at least polymer with an olefinic compound dissolved or uniformly dispersed therein; and ii) a transition metal catalyst and a thiophenol or a catalytic amount of a thiyl radical; and
b. removing the solvent from the solution to form the coating.

DETAILED DESCRIPTION OF THE INVENTION

This invention describes the method of using a solution of organometallic complexes in a polymeric material, referred to as metal-polymer composites, that, for example, may comprise as the reading-inhibit agent (RIA) a colloidal dispersion of metal or transition metal or metal-oxide or transition metal-oxide dispersed uniformly as nano particulate in a polymeric matrix, so as to exhibit a high degree of transparency to desirable wavelengths of light for a limited time. The polymeric material and polymeric matrix can be, but are not limited to, a solid which can, for example, be characterized by a glass transition temperature that could be higher than 200° C. or lower to temperatures below room temperature, or a gel. Both rigid or high modulus and soft or low modulus solid polymers are contemplated.

Metal-polymer composites with a high degree of homogeneity can, by way of example, be prepared by mixing a polymer solution and the appropriate organometallic complex or precursor or by solution growth techniques or direct implantation under influence of an electric field or by dissolution in solutions of functional polymers. Subsequent treatment, such as chemical or thermal, or use of actinic radiation can transform the organometallic complex into the corresponding metal or transition metal or metal oxide or transition metal-oxide or some other desirable species. Under appropriate conditions, this transformed species will exist as a homogeneous dispersion of nanoparticles. "Nanoparticles" are defined to be particles having a dimension no greater than about 50 nanometers in any one direction, preferably between about 5 to 30 nanometers in any one direction. Dry polymer coatings of such nanoparticle dispersions will be optically transparent since the particulate size of the nanoparticles will be less than about 1/10 the wavelength of visible light. Typically these dispersions, and subsequent coatings maintain their homogeneity under controlled environmental conditions, such conditions being quite similar to those required for storage of proposed limited-play disks in the aforementioned prior art. Methods to control such environmental conditions are consistent with those specified in the prior art.

This invention discloses, and in particular, describes the use of colloidal dispersions in a polymeric matrix as the RIA to limit the readability of an optical medium. The colloidal metal, transition metal, metal oxide or the like, initially dispersed in a polymer solution, functional polymer solution, or in a monomer or oligomer containing medium that is polymerizable by use of light and/or heat, exists in a polymer matrix layer that is substantially colorless and substantially transparent to an interrogating beam of optical irradiation for some desirable limited amount of time, and where said desirable time is defined by what is necessary and/or preferred for the intended use. Subsequently, the RIA can, for example, after exposure to ambient conditions become morphologically unstable forming aggregates that exhibit substantially increased particulate size such that they act as scattering sites to visible wavelengths and/or change color or reflectivity or amount of transparency to said desirable wavelengths. As used herein, "ambient conditions" means the conditions under which the RIA is typically used. Oxygen and moisture in the air, light used in optical read-out systems and heat generated in optical read-out systems are examples of conditions that are encompassed within the term "ambient condition", as it is used herein.

In one embodiment the colloidal dispersion is a metal or transition metal, which when exposed to oxygen in the air or from some other source becomes oxidized to a metal oxide and, in turn changes the physical nature of the dispersion which causes the development of scattering centers throughout the polymer matrix.

$xM^0[O] \rightarrow M_xO_y$ where M includes but it not limited to elements such as Al, Si, Cr, Fe, Co, Ni, Cu, Zn, In, Sn, Ag, Au, Pt, Pd, Mo, and W. The preparation of the nano or colloidal dispersions of metals is known in the art and is described for example, in T. W. Smith and D. Wychick J. Phys. Chem. 1980, 84, 1621-1629, H. H. Huang etal. Langmuir 1996, 12, 909-912 and H. Hirai, H. Wakabayashi and M. Komiyama, Bull.Chem. Soc. Jpn., 1986 59, 367-372, the entire teachings of which are incorporated herein by reference.

In another embodiment a colloidal dispersion of a noble metal such as Au, Pt or Pd can be prepared as the RIA. Dispersions of this type are stabilized by specific interactions between the metal and ligands in the dispersion. These dispersions are stable when protected from light or heat or air and in particular $O_2$. Exposure to various ambient conditions destabilizes the ligand-metal interaction causing the noble metal to phase separate or agglomerate, thereby forming aggregates that scatter visible light or in extreme cases the film can become substantially reflective to light. In some cases the metal may undergo a chemical reaction forming a new species, such as a metal oxide, that will change the color of the polymer layer and/or cause scattering by precipitation or by a change in the refractive index of the metal when it transforms to the metal oxide.

Alternately, the RIA could be a material that when dispersed or dissolved in a polymeric matrix forms a layer with high transparency to desirable wavelengths of light, and upon subsequent exposure to ambient conditions the material undergoes a phase change, chemical reaction or isomerization of unsaturated chemical bonds in its chemical structure to substantially reduce the transparency of the film to said desirable wavelengths. The chemical reaction could, by way of example, be catalyzed carbon-carbon double bond cleavage due to olefin oxidation, such as can be promoted by a transition metal catalyst and a thiophenol, or catalytic amounts of a thiyl radical (see X. Baucherel, J. Uziel and S. Juge in J. Org. Chem. 2001, 66, 4504-4510, the entire teachings of which are incorporated herein by reference). Suitable olefins include aryl olefins, aliphatic olefins, functionalized olefins (e.g., functionalized with esters, ketones, nitrites, carboxylic acids and the like); suitable transition metal catalysts include $MnCl$, $V(acac)_3$, $VCl_3$, Vanadium oxo bis(1-phenyl-1,3-dibutanedionate and the like); and suitable thiophenols include unsubstituted thiophenol and thiophenols substituted with halogens, alkyl groups and the like. Other suitable olefins, transition metal catalysts and thiophenols are disclosed in Baucherel et al.

The RIA can be incorporated as a coating on all or part of a surface (internal or external surface) of device for which a change in transparency and/or coloration is desirable upon exposure to an ambient condition. The RIA can also be incorporated as a complete or partial coating on a part from which such a device is assembled. Examples of such devices include an optical disc, card, media (such as holographic recording medium) and the like. The RIA can be applied between the information carrying layer comprising data structures or the reflective layer encoded with said information data structures, said reflective layer may be disposed as a layer on the features comprising such information data structures, and the topmost or bottom surface of the disk, card, media or the like or the RIA may be in the topmost or bottom layer of the disk, card, media or the like, or it may be incorporated as an adhesive bonding layer such as used between the two sides of DVD optical disks, or may be contemplated for use in multilayer optical disks, cards, media or the like, comprising two or more information carrying layers comprising data structures, or in other ways that would effect the ability to interrogate and read the information data structures stored in or on an optical disc, card, media or the like. The RIA can be incorporated, for example, as a coating on all or part of a holographic recording medium so that the imaging beam(s) pass through the RIA before or after contacting some or all of the data structures. Holographic recording mediums are disclosed in U.S. Pat. No. 6,212148, WO 01/90817 and WO 97/13183, the entire teachings of which are incorporated herein by reference. A "data structure" is a structure in an optical disk, card or media that stores information. In a CD or DVD, the data structures are a sequence of pits and lands; in a holographic recording medium, the data structures are regions or holographic recording; and in a phase change medium such as a writable CD or DVD, the data structures are related to regions of phase change.

More specifically, organometallic complexes that are used for the RIA of the solid solution can be prepared by dissolving metal or transition-metal carbonyl compounds in polymers or in materials comprising one or more polymerizable monomer(s) and/or oligomer(s). Solutions formed from the metal or transition-metal compounds and polymers can, for example, be cast into solid films on a surface such as the substrate, the metallized layer, a barrier layer, or other layers contemplated for optical disks, cards, media or the like, whereas solutions comprising polymerizable monomers and/or oligomers can be dispensed onto any of the aforementioned surfaces or other layers contemplated for optical disks, cards, media or the like or into a gap between two such surfaces, and the monomers and/or oligomers can be subsequently polymerized to form a solid film by use of actinic radiation or heat or combinations thereof. Decomposition of the metal or transition-metal compounds to form uniform metal oxide dispersions causes significant changes to the particle size exhibited by these materials such that the solid solution changes from a substantially transparent non-absorbing state, for desirable wavelengths of light, to a state that scatters light effectively over a broad range of desirable visible wavelengths extending from violet or short blue to red or even to near IR. The polymer or subsequently polymerized monomers or oligomers can additionally serve as a catalyst, via nonbonded dispersive Van der Waals interactions and electrostatic type interactions, such as charge-charge, charge-dipole or dipole-dipole, for the desired decomposition of the metal or transition-metal carbonyl compounds (see for example T. W. Smith and D. Wychick, J. Phys. Chem. 84, 1621 (1980)). $Fe(CO)_5$ is one such example of an organometallic complex that, by way of example, as a liquid can be dissolved in polymers and thusly prepared as a homogeneous solid solution in polymer films Films comprising, for example, $Fe(CO)_5$ can exhibit acute sensitivity to UV radiation causing rapid formation of the reactive intermediate $Fe(CO)_4$ which reacts with excess $Fe(CO)_5$ to form $Fe_2(CO)_9$. The latter compound is substantially more susceptible to oxidation and subsequent decomposition to iron oxide, $Fe_2O_3$, can occur in relatively short time periods as a consequence of exposure to ambient conditions comprising air. Films that are adequately shielded from light and/or air or are adequately protected by a shielding layer, however, can be kept for long periods in the presence of air without exhibiting significant decomposition.

Another example of such an organometallic complex that, by way of example, can be used to form solid solutions in a broad spectrum of polymers is $Co_2(CO)_8$ (see P.H. Hess and H. Parker, Jr. Appl. Polym. Sci., 10, 1915 (1966)), and the resultant oxidation products are $CoO$ and $Co_2O_3$. One advantage of using organometallic complex materials as the RIA is that they can be readily prepared in solutions using standard organic solvents or in solutions of polymers or functional polymers or using polymerizable monomers and/or oligomers, and these solutions exhibit substantially enhanced stability to decomposition and subsequent oxidation as compared to solid solutions (see for example R. Tannenbaum, C. L. Flenniken and E. P. Goldberg, XI International Conference on Oganometallic Chemistry, 1983, p.77) that would be used as film type layers in or on an optical disk, card, or the like. This is beneficial from the standpoint of preparing materials for coatings in a way that is consistent with manufacturing processes. Moreover, activation energies for decomposition of, for example, the $Fe(CO)_5$ complex can exceed 35 kcal/mole in a solid solution of polymethylmethacrylate and 45 kcal/mole in polycarbonate (see R. Tannenbaum, E. P. Goldberg, and C. L. Flenniken, "Decomposition of Iron Carbonyls in Solid Polymer Matrices: Preparation of Novel Metal-Polymer Composites" in Metal-Containing Polymeric Systems, eds. J. E. Sheats, C. E. Carraher, Jr., and C. U. Pittman, Jr., Plenum Press, New York, 1985, pp. 320-327), values that are consistent with many of years of storage of a disk comprising said complex prior to intended use. Activation of the $Fe(CO)_5$ or $Co_2(CO)_8$ complex can be accomplished by exposure to UV radiation (see for example G. O. Schenck, E. Koerner van Gustorf and Mon-Jon Tun, Tetrahedron Letters, 1059 (1962)). Protection against subsequent oxidation in the presence of air can be provided, independently or in combination, by use of a barrier layer or use of inert gas in packaging of the optical disk, card, or the like or use of oxygen scavengers commonly found in packaging of foods, or other such methods independently or in combination so as to prevent or slow down diffusion of oxygen to the layer containing the RIA material. Exposure to UV radiation for purposes of activating the RIA material for subsequent oxidation can be readily implemented as part of the manufacturing process of the limited play optical disks, cards, or the like, such as would be used for an inline or continuous-batch photolytic process that initiates polymerization reactions in solutions comprising the RIA and monomers and/or oligomers.

Polymers that are suitable for use in the disclosed compositions and methods are substantially optically transparent and substantially colorless. "Substantially optically transparent" and "substantially colorless" means that when the polymer is incorporated into or onto an optical disk, card or media, the polymer does not interfere with the ability of the interrogating beam of light used in the optical read-out system being used to read the optical disk, card or media. Preferred polymers are thermoplastic polymers and/or are formed from photopolymerizable or thermopolmerizable monomer(s) and/or oligomer(s) comprising, but not limited to, ethylenically unsaturated groups, epoxide groups or combinations thereof. Examples of suitable polymers include, but are not limited to polystyrenes, polyacrylates, polyacrylonitriles, polyesters, polycarbonates, polysulfones, polyalkylene oxides, polypyrrolidones, polyamides, polyurethanes, polythiazoles, poysiloxanes, polyphthalates, or copolymers thereof. Another example includes polymers formed from hydrosilylation reactions with, for example, vinylfunctionalized groupings and hydrofunctionalized siloxanes. Typically, polymers suitable for use in the disclosed invention have a threshold molecular weight greater than 1000 amu.

Advantageously, the method contemplated in this invention does not require any significant or difficult changes to the existing manufacturing methodology used, for example, to prepare optical discs for CD and/or DVD players. Additionally, the method does not require special modification to the existing read device technology. Moreover, this methodology does not require the incorporation of hazardous volatile components to activate the RIA, nor does it incorporate or create chemical species that would interact unfavorably with components of the read device (i.e. optical head) or of the optical drive itself. Additionally, and perhaps most importantly, this invention provides a method to limit the play time of an optical disc or card in a optical drive, such as DVD or CD player, in a manner which can not be defeated by photobleaching of the RIA, or by changing the wavelength of the interrogating beam.

EXAMPLE (1) A typical formulation comprising the RIA contemplated by this invention is a formulation that preferably can be coated or delivered to a surface or between surfaces by normal means, such as spin coating, dip coating or the like, and is deposited on recording media as a coating or as an interstitial adhesive layer in a multilayer disc, card, or the like. The delivered formulation preferably can be cured or crosslinked by normal techniques, such as use of actinic radiation or heat, or alternatively it may be cast from a solution into a polymer film without requiring a cure. The cured, crosslinked or cast film or interstitial layer is positioned intermediate between the stored information data and/or file directory structures and the detector used to read said stored information data and/or file directory structures. In such an arrangement the interrogating beam used to read the media must traverse said coating or layer at least once. The formulation, by way of example, comprises an organometallic complex, a polymerizable component or components, optionally a binder polymer or oligomer, optionally a crosslinkable functional polymer or oligomer, and polymerization initiation system. Alternatively, the formulation comprises an organometallic complex and a polymer or functional polymer or copolymer, or combinations thereof. The organometallic complex can be any number of materials that degrade in the presence of oxygen such as cyclopentadienyl complexes of chromium, nickel, cobalt, titanium, tungsten or platinum or ruthenium or others described in the above specification of the invention such as an $Fe(CO)_5$ complex or $Co_2(CO)_8$ complex. Another desirable feature of these organometallic complexes would be the apparent auto-catalytic behavior these materials exhibit upon decomposition. This would allow for good control of the kinetics of decomposition and offer a superior product over other candidates.

(2) A typical formulation comprising the RIA contemplated by this invention is a formulation that preferably can be coated or delivered to a surface or between surfaces by normal means, such as spin coating, dip coating or the like, and is deposited on recording media as a coating or as an interstitial adhesive layer in a multilayer disc, card, or the like. The delivered formulation preferably can be cured or crosslinked by normal techniques, such as use of actinic radiation or heat, or alternatively it may be cast from a solution forming a polymer film without requiring a cure. The cured, crosslinked or cast film or interstitial layer is positioned intermediate between the stored information data and/or file directory structures and the detector used to read said stored information data and/or file directory structures. In such an arrangement the interrogating beam used to read the media must traverse said coating or layer at least once. The formulation, by way of example, comprises a colloidal suspension of a metal such as platinum, palladium, gold, or silver, a polymerizable component or components, optionally a binder polymer or oligomer, optionally a crosslinkable functional polymer or oligomer, and polymerization initiation system, such that the ligand-colloidal particle interaction or other electrostatic or dispersive interaction stabilizing the colloid can be destabilized in the presence of oxygen leading to agglomeration and/or phase separation thereby forming particulates or aggregates that scatter light. In such an example a surfactant or surfactant-like grouping is, by way of example, independently, a monovalent substituted or unsubstituted thio-alkyl, thio-cycloalkyl, thio-arylalkyl, sulfide, or disulfide ligand that is used to stabilize a colloidal suspension of a noble metal such as gold. It is well understood that specific interactions between the alkanethiol, sulfide, and disulfide ligand and the nanoparticle lead to stable colloidal suspensions. It has also been observed that the interaction between the alkanethiol, sulfide or disulfide ligand and the nanoparticle are susceptible to air oxidation, destabilizing the ligand-metal interaction leading to agglomeration or aggregation of the nano-particles. Such aggregation substantially increases the size of the particles and consequently visible light will be scattered at locations of these particles in the suspension. Similar behaviors are observed for alkyl carboxylic acid stabilized colloidal suspensions of, for example, Fe, Al, Cu and Co.

The invention is illustrated by the following examples which are not intended to be limiting in any way.

EXEMPLIFICATION

Example 1

A transparent coating of a precursor to a read inhibiting agent was prepared in the following manner. In a glove box or other such inert, oxygen free environment, a vial was charged with 2.0 grams of an optical adhesive, OP21 from Dymax Corporation and 0.4 grams of Iron pentacarbonyl. Following mechanical stirring a homogenous formulation was obtained. Two cells for testing the RIA were prepared by sandwiching the formulation between two glass slides, a base and a cover slip. The formulation was left to cure in ambient light, about 30 min. Next, one of the two cells was removed from the glove box and the cells cover slip was carefully removed. The pale yellow film was left exposed to ambient conditions. After 5 hours the film had become dark brown in color. The control sample in the glove box remained transparent pale yellow.

Example 2

A transparent coating of a precursor to a read inhibiting agent was prepared in the following manner. In a glove box or other such inert, oxygen free environment, a vial was charged with 10 grams of a 50 wt% solution of Polystyrene (Aldrich product 33,165-1) in toluene previously degassed with $N_2$. Next a solution of nickel cyclooctadiene [hereinafter "Ni (COD)2"] in toluene, 250 mg of Ni(COD)2 in 5 mL of toluene was added to the polymer solution. After thorough mixing the yellow orange solution was applied, via spin coating, to glass substrate. After drying the pale orange film was exposed to ambient conditions. After 1 hour the film developed haze which became quite pronounced after about 5 hours of exposure to ambient conditions.

Example 3

A transparent coating of a precursor to a read inhibiting agent was prepared in the following manner. In a glove box or other such inert, oxygen free environment, a vial was charged with 3.0 grams of Dow Coming 93-500 Base, 0.30 grams of Dow Coming 93-500 curing agent and 3.3 mL of Toluene. To the polymer solution was added 0.150 grams of $Ni(COD)_2$ dissolved in 3 mL of toluene. After thorough mixing the yellow orange solution was applied, via dip coating, to glass substrate. After drying the pale orange film was exposed to ambient conditions. After 1 hour the film developed haze which became quite pronounced after about 3 hours of exposure to ambient conditions.

The resulting reduction in transparency was evaluated using illumination from a frequency doubled diode pumped solid state laser emitting at 532 nm. The spot dimensions corresponding to the area of illumination was a square of 3 mm by 3 mm. The transmitted intensity declined by a factor of between 4 and 17.5 depending upon the thickness of the coated film. The decline in transparency occurred resulted from the light being diffused into a larger area as a consequence of the haze that was formed in the film. While this invention has been particularly shown and described with references to preferred embodiments thereof, it will be understood by those skilled in the art that various changes in form and details may be made therein without departing from the scope of the invention encompassed by the appended claims.

What is claimed is:

1. An optical disk, card or media for use in an optical read-out system that comprises a light source operative to produce an interrogating beam of light for reading data structures, comprising:
   a. a plurality of data structures that are readable by the interrogating beam of light; and
   b. a composition on or in the optical disk disposed so that when the optical disk, card or media is used in the optical read-out system, the interrogating beam of light passes through the composition before or after contacting some or all the of the data structures,
   wherein the composition comprises:
      i) a solid polymeric matrix with an olefinic compound dissolved or uniformly dispersed therein; and either
      ii) a transition metal catalyst and a thiophenol; or
      iii) a catalytic amount of a thiyl radical, wherein either the transition metal catalyst or the thiyl radical are present in the amounts sufficient to cause carbon-carbon double bond cleavage, oxidation, or isomerization in the olefinic compound when exposed to ambient conditions, and wherein the composition is substantially transparent to the interrogating beam and/or is substantially colorless.

2. The optical disk or card of claim 1 further comprising:
   a. a metallic layer; and
   b. a substrate disposed in a confronting relationship with the metallic layer.

3. The optical disk or card of claim 1 wherein the composition is a film superimposed on or over at least some of the data structures.

4. The optical disk or card of claim 1 wherein carbon-carbon double bond cleavage, oxidation, or isomerization in the olefinic compound forms a product which reduces the transparency of the composition to the interrogating beam and/or increases the coloration of the composition.

5. The optical disk or card of claim 1 wherein the polymeric matrix is a thermoplastic polymer.

6. The optical disk or card of claim 1 wherein the polymeric matrix is formed from a photopolymerizable or thermopolymerizable monomer and/or oligomer comprising ethylenically unsaturated groups, epoxide groups or combinations thereof.

7. A method for coating an internal or external surface of an information carrying layer of a device for use in an optical read-out system with a layer that is substantially transparent to visible light wherein the layer undergoes a reduction in said transparency when exposed to an ambient condition, said method comprising the steps of:
   a. dispensing onto the surface a film of a solution comprising:
      i) at least one monomer or oligomer with an olefinic compound dissolved or uniformly dispersed therein; and either
      ii) a transition metal catalyst and a thiophenol; or
      iii) a catalytic amount of a thiyl radical; and
   b. polymerizing the monomer or oligomer to form a polymeric coating, wherein the coating is
   disposed so that an interrogating beam of light passes through the solution before or after contacting some or all of the information carrying layer,
      wherein either the transition metal catalyst or the thiyl radical are present in the amounts sufficient to cause carbon-carbon double bond cleavage, oxidation, or isomerization in the olefinic compound when exposed to ambient conditions.

8. The method of claim 7 wherein the device is an optical disk or card or a part thereof.

9. The method of claim 7 wherein the information carrying layer is a substrate, a metallized layer, a barrier layer, a holographic recording layer, or a layer of a phase change media.

10. The method of claim 7 wherein the monomer solution comprise one or more monomers or oligomer(s) which form a thermoplastic polymer when polymerized.

11. A method for coating an internal or external surface of an information carrying layer of a device for use in an optical read-out system with a layer that is substantially transparent to visible light wherein the layer undergoes a reduction in said transparency when exposed to an ambient condition, said method comprising the steps of:
   a. dispensing onto the surface a film of a solution comprising:
      i) at least one polymer, with an olefinic compound dissolved or uniformly dispersed therein; and either
      ii) a transition metal catalyst and a thiophenol; or
      iii) a catalytic amount of a thiyl radical; and
   b. removing the solvent from the solution to form the coating, wherein the coating is disposed so that an interrogating beam of light passes through the coating before or after contacting some or all of the information carrying layer,
   wherein either the transition metal catalyst or the thiyl radical are present in the amounts sufficient to cause carbon-carbon double bond cleavage, oxidation, or isomerization in the olefinic compound when exposed to ambient conditions.

12. The method of claim 11 wherein the device is an optical disk or card or a part thereof.

13. The method of claim 11 wherein the information carrying layer is a substrate, a metallized layer, a barrier layer, a holographic recording layer, or a layer of a phase change media.

14. The method of claim 11 wherein the polymer is a thermoplastic polymer.

15. A method of limiting access to data stored on an optical disk, card, said optical disk, card or media being used in an optical read-out system that comprises a light source operative to produce an interrogating beam of light for reading data structures, said method comprising the step of exposing the optical disk, card or media to an ambient condition, wherein the optical disk, card or media comprises:
   a. a plurality of data structures that are readable by the interrogating beam of light; and
   b. a composition on or in the optical disk disposed so that when the optical disk, card or media is used in the optical read-out system, the interrogating beam of light passes through the composition before or after contacting some or all of the of the data structures, wherein the composition comprises:
      i) a solid polymeric matrix with an olefinic compound dissolved or uniformly dispersed therein; and either
      ii) a transition metal catalyst and a thiophenol; or
      iii) a catalytic amount of a thiyl radical, and wherein the composition is substantially transparent to the interrogating beam and/or is substantially colorless,
   wherein either the transition metal catalyst or the thiyl radical are present in the amounts sufficient to cause carbon-carbon double bond cleavage, oxidation, or isomerization in the olefinic compound when exposed to ambient conditions.

16. The method of claim 15 wherein the ambient condition is exposure to the interrogating beam of light.

* * * * *